May 9, 1933.  I. B. SWEGLES  1,907,897
METHOD OF MAKING SPLINE SHAFTS
Filed Dec. 17, 1930  3 Sheets-Sheet 1
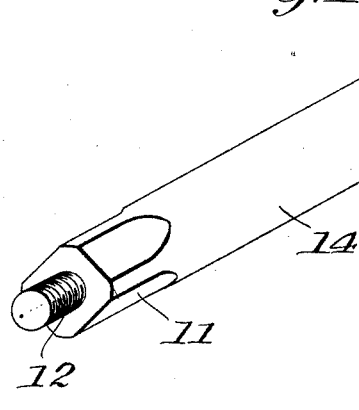
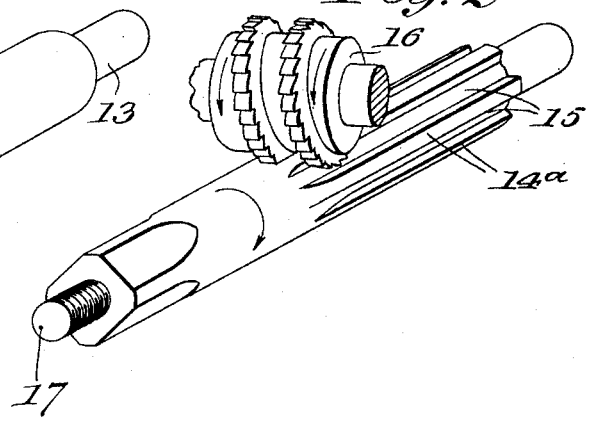
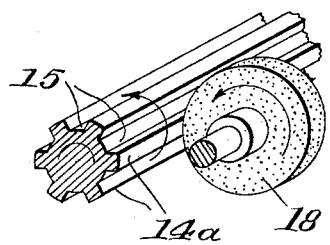
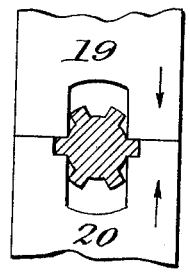
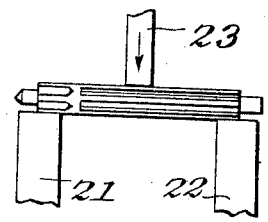
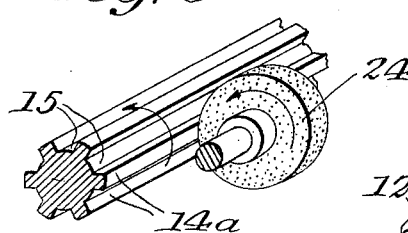
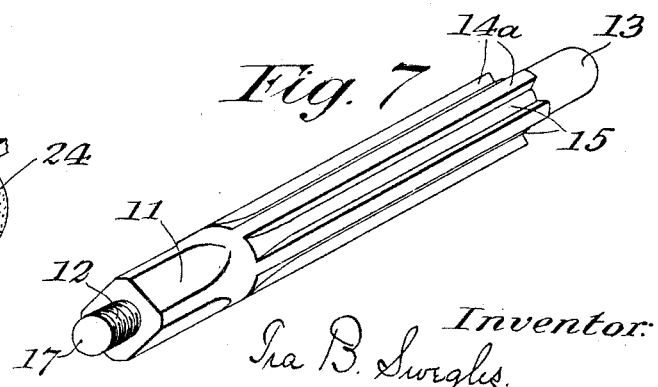
Inventor:
Ira B. Swegles.
By Macleod Calver Copeland & Dike
Attorneys.

May 9, 1933.  I. B. SWEGLES  1,907,897

METHOD OF MAKING SPLINE SHAFTS

Filed Dec. 17, 1930   3 Sheets-Sheet 2

Inventor:
Ira B. Swegles
By MacLeod Calver Copeland & Dike
Attorneys

May 9, 1933.  I. B. SWEGLES  1,907,897
METHOD OF MAKING SPLINE SHAFTS
Filed Dec. 17, 1930  3 Sheets-Sheet 3
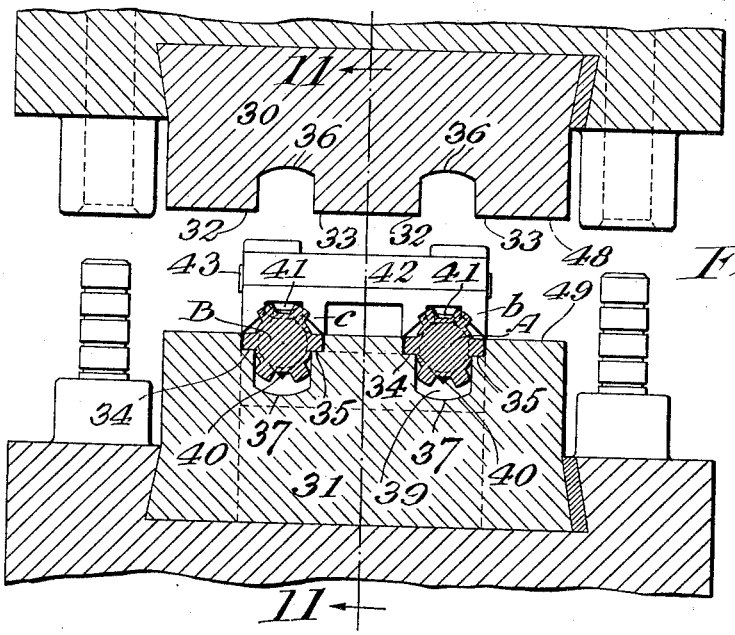
Fig.10
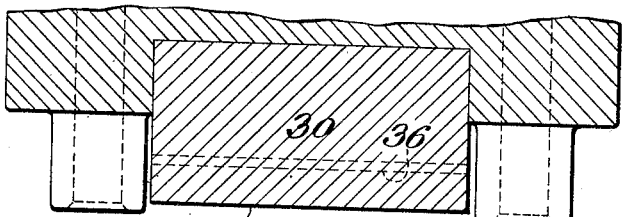
Fig.11
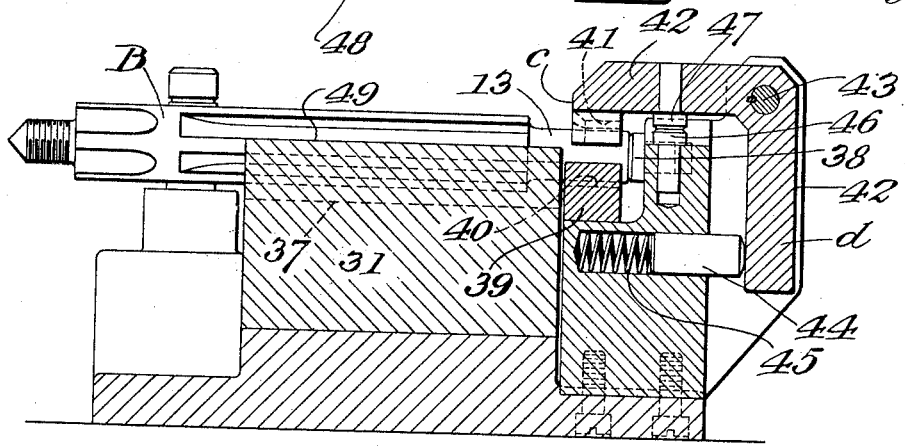
Inventor:
Ira B. Swegles.
By Macleod Cahn Copeland & Dike
Attorneys.

Patented May 9, 1933

1,907,897

UNITED STATES PATENT OFFICE

IRA B. SWEGLES, OF DETROIT, MICHIGAN, ASSIGNOR TO HUDSON MOTOR CAR COMPANY, OF DETROIT, MICHIGAN, A CORPORATION OF MICHIGAN

METHOD OF MAKING SPLINE SHAFTS

Application filed December 17, 1930. Serial No. 502,968.

My invention relates to the manufacture of spline shafts which are used in transmissions particularly for automobiles.

The object of my invention is to provide a spline shaft equal to or better than those now on the market and at a reduced cost.

It is well understood by those skilled in the art, that spline shafts for use in transmissions and the like must be made with extreme accuracy so that the gear with which it is used will slide freely and uniformly in all positions of the shaft and the transmission will be quiet in operation. It is also essential that the shaft be hard so that it will not wear even after long periods of use rendering the transmission noisy.

Heretofore, spline shafts have been manufactured in a variety of ways. One of several methods commonly employed has been that shown and described in Letters Patent of the United States, No. 1,271,495, dated July 2, 1918 to Frederick A. Ward in which the shaft is formed slightly oversize and then hardened after which the surplus stock on the sides of the splines and on the barrel of the shaft, i. e., the curved surface between the sides of adjacent splines, is removed by grinding with a W-shaped grinding wheel having a contour complementary to the contour of the space between the splines, this wheel being mounted in a machine which causes it or the shaft to travel lengthwise. Another method includes grinding the barrel of the shaft with a grooved grinding wheel and the sides of the splines with cylindrical wheels. Two or more cuts of the wheel or wheels are usually necessary to remove the surplus stock. In these and all other grinding methods it is necessary to restore the grinding wheel to its original shape by trimming or truing it by a diamond. These methods have proved expensive on account of the costly machinery required, the skilled labor necessary to operate it, the constant replacement of grinding wheels, the expense for diamonds, the relatively slow production of shafts, and the losses from imperfect work.

My present invention does away altogether with grinding the sides of the spines but gives to them a finish superior to that produced by grinding and is based on the discovery that the sides of the splines may be finished and trued by subjecting them to heavy pressure in polished dies after which it is preferable to grind the ends of the splines in an ordinary cylindrical grinder which is a simple inexpensive operation, requiring machinery which may be maintained in accurate condition with little trouble or skill.

In practicing my invention the shaft may be heat treated either before or after the splines are pressed but I find it entirely practical to press the shafts before heat treating in which case the slight warping which occurs is readily removed by straightening the shaft by pressing it in an arbor press in the way now commonly practiced in connection with shafts produced by present methods. By pressing the shaft before it is heat treated, the metal flows somewhat more easily; therefore the pressure required is not quite so great.

In practice I find that by my new method one man can produce in an hour with one machine about as many shafts as he could in a day using two grinding machines and that the shafts produced are of better quality. There is no expense for the formed or straddle grinding wheels nor for diamonds for truing them, and no difficulty in maintaining the correct contours of the wheels with relation to the axis of the shaft to be produced nor in keeping the corners of the wheels sharp. The die expense is practically nothing since new dies cost only a few hundred dollars and require no attention until they have made a hundred thousand or more impressions after which a little grinding will restore them to usefulness. The press required is the ordinary so-called "coin" press which is capable of use for other purposes when not employed in the manufacture of shafts.

In the drawings:

Figs. 1 to 7 inclusive are diagrammatical views showing the different steps of the method of my invention.

Fig. 10 is a similar view to Fig. 9 but showing the press in opened position.

Fig. 11 is a sectional view taken along the lines 11—11 of Fig. 10.

Figure 8:
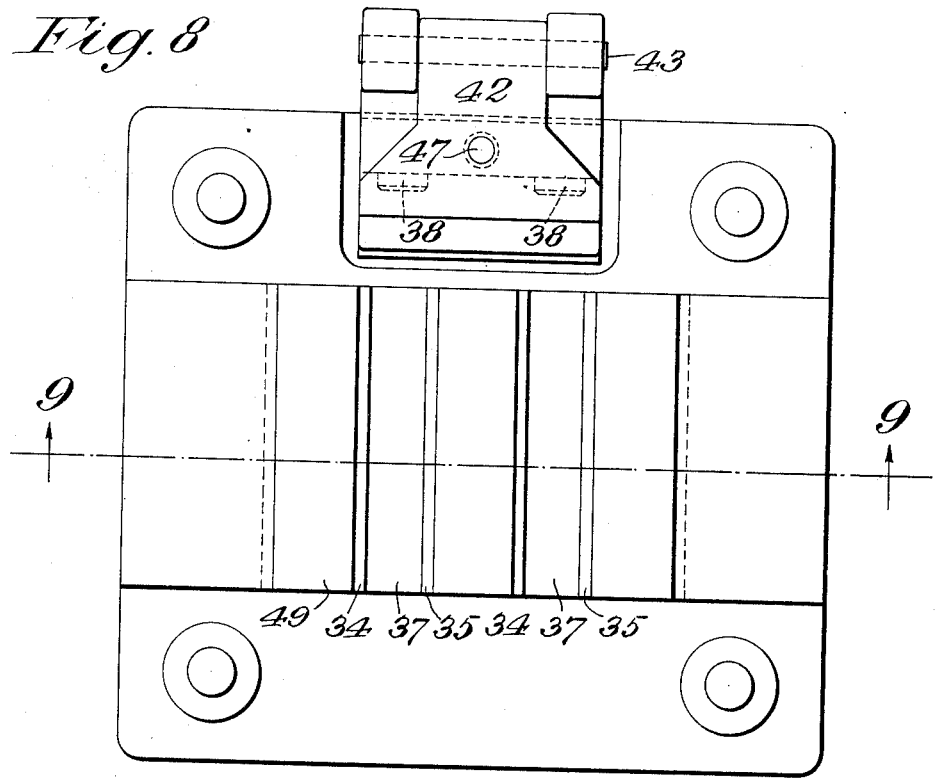
Fig. 8 is a top plan view of the lower die and parts of a press used in connection with my invention.

In practicing my invention in the preferred form, I first rough form the shaft, usually in two operations shown in Figs. 1 and 2 of the drawings. In the first operation (Fig. 1) the round bar of stock of the proper length and diameter is squared as shown at 11 and screw threaded on one end as shown at 12, and on the other end is turned down to the required diameter as shown at 13, the middle of the shaft being left round as shown at 14 for the formation of the splines. In the next operation which is indicated in Fig. 2 the splines 14a separated from each other by interdental spaces 15 are all formed preferably by hobbing, this being the ordinary term for the formation of teeth by a rotary cutter 16 which cuts the spaces between the splines as the shaft rotates and also is moved lengthwise under the hob or cutter. During this operation the shaft rotates on centers one of which is shown at 17. In practice, the outside diameter of the shaft is then rough ground in a cylindrical grinder and on the centers 17, this operation being indicated in Fig. 3. By the hobbing and rough grinding operations shown in Figs. 2 and 3, the shaft is given its final form and shape except that sufficient stock is left on the cylindrical surface of the splines, teeth or keys to be removed by the final grinding, the wheel being shown at 18 in Fig. 3, and the thickness of the splines, measured on the chord of the circle formed by a cross-section are slightly oversize to allow for the pressing operation which will be described a little later. It will be understood that the amount of stock which is removed by the final grinding is exceedingly small, and that the oversize to allow for pressing is likewise exceedingly small—ordinarily in the vicinity of five to ten one thousandths of an inch. After the shaft has been completed to the point thus far described, it may be given the heat treatment given ordinarily to spline shafts to toughen the metal and render it suitable for its intended use. In practice, however, I prefer to defer the heat treatment until after the pressing operation which will now be described.

The pressing operation consists in subjecting the opposite sides of each pair of splines to pressure between dies, the pressure being great enough to cause the metal of the splines to flow very slightly and to assume a surface complementary to the surface of the dies. As the dies can be given a high polish, this polish can likewise be given to the sides of the splines. In fact the finished spline sides are given a finish which more nearly compares to a handlapped shaft than to a ground shaft and is superior to anything heretofore produced commercially. In practice, I find that it is possible to press both sides of two diametrically opposite splines at one time as shown in Fig. 4, in which the upper die is designated 19 and the lower die 20. The details of the special press in which this work is performed is described hereafter, but it is to be observed here that the dies may be formed so that each die will receive two or more shafts thus greatly increasing the speed of the operation.

After the pressing operation, and if the shaft has not been previously treated, it is then heat treated as desired. Next it is inspected and if found to have been warped by the heat treatment, it is straightened as shown in Fig. 5. This is done by supporting the shaft as shown at 21 and 22 on suitable supports which contact with the cylindrical surface of the splines, and then exerting a suitable pressure in the middle by a press as indicated at 23. This operation is easily performed in an arbor press and is identical with the straightening operation now commonly employed in the manufacture of ground shafts.

Next the shaft is given the finish grinding on the outside diameter in a cylindrical grinding machine, the wheel of which is designated at 24 in Fig. 6. The shaft is supported on the centers 17 during this operation and therefore the final surface is in proper relation to the surfaces formed by the hobbing operation. The stock to be removed by the final grinding depends on the amount left by the first grinding and the amount of stock which has been forced outwardly by the pressing operation, but in practice it is found that this amount is exceedingly small so that the final grinding takes a very light cut and leaves a finely finished surface.

Figure 9:
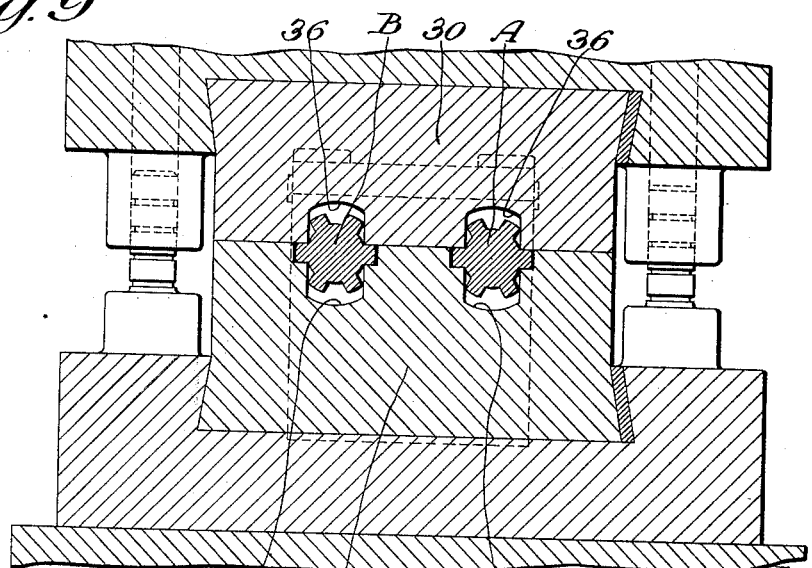
Fig. 9 is a sectional view taken along the lines 9—9 of Fig. 8 showing the press in closed position.

The press in which the pressing operation is performed is shown in Figs. 8, 9, 10 and 11 and in general is an ordinary coin press, so-called, of the kind originally developed for use in the manufacture of coins and medals and now also frequently employed for other purposes where heavy pressures on small surfaces are required. The press also includes certain improvements which will now be described. At 30 and 31 are shown the upper and lower die members having therein pressing surfaces 32, 33, 34 and 35 for the sides of two opposite splines of two shafts A and B. Each die is cut away as shown at 36 and 37 to clear the splines which are not being pressed, and both dies are open at both the front and back, as will be apparent from Fig. 11. Behind the lower die and in line with the axis of the shaft when in place in the die is an adjustable button 38 which positions the shaft lengthwise in the die. Also behind the lower die is placed a lower guide member 39 having two V-shaped cavities 40 to receive the rounded portions of the shafts and hold them in position while the operator is turning them after pressing a preceding pair of keys. I also provide a yielding L-shaped hinged upper guide member 42 pivoted at 43 and provided with two downward projections *b* and *c* at the front end which are shaped to fit over the round portion 13 of the shaft A or B as the case may be thus with the guide member 39 enclosing the round portion of the shaft. The tail *d* of the hinge member 42 extends downwardly in contact with a spring plunger 44 held outwardly by a spring 45 and tending to swing the hinge member on the pivot 43. The downward movement of the hinge member is limited by a stop button 46 contacting with a stop button 47 which is carried in the hinge member 42. The hinge member is so adjusted that it will just contact with the cylindrical portions 13 of the two shafts when they are properly positioned in the lower die. In other respects the press employed is of well known construction.

In practice and in my improved method of producing spline shafts with the press herein described, the operator takes a pair of shafts inserts the rear ends of the shaft under the hinge member and then lowers the shafts into the respective die cavities with the sides of two opposite splines pressing on the shoulders in the die cavity. Thereafter the press descends and compresses the two splines of each shaft until the face 48 of the upper die contacts with the face 49 of the lower die. This gives to the splines exactly the right amount of compression causing the almost infinitesimal surplus of metal to flow and giving to the surface of the spline a uniform permanent highly polished surface complementary to the surface of the die and in fact a surface which seems to be more perfectly finished than any surface heretofore obtained on spline shafts. As soon as the press is released the operator lifts the shafts out of the die cavities, rotates each shaft the necessary amount during which they are guided by the recesses 40 and 41 in the guide members 39 and 42, replaces them in the dies and then presses the surfaces of the next pair of splines. If the shaft has six splines the operation is repeated once more.

I claim:

1. The method of making splined shafts which consists in rough forming the shaft with the splines slightly oversize, and then flattening the sides of the splines by subjecting them to heavy pressure in dies.

2. The method of making splined shafts which consists in rough forming the shaft with the splines slightly oversize, then flattening the sides of the splines by subjecting them to heavy pressure in dies, and then finishing the outside diameter of the splines.

3. The method of making splined shafts which consists in rough forming the shaft with the splines slightly oversize, and then finishing the sides of the splines by pressing simultaneously both sides of each of a pair of diametrically opposite splines in dies under pressure sufficient to flatten the sides of the splines.

4. The method of producing a splined shaft which consists in forming the same of steel with projecting splines and intermediate grooves between the splines leaving stock to permit pressing of the splines and presssing the splines between dies which contact with the two side surfaces of the several splines to render the same smooth throughout their length and width and symmetrical with reference to the axis of the shaft, and grinding the cylindrical surfaces of the splines concentric with the axis of the shaft.

5. The method of producing a shaft which consists in forming the same of steel with projecting splines and intermediate grooves between the splines, said splines being slightly oversize and then subjecting the side faces of two diametrically opposite splines to pressure in a die sufficient to permanently shape the metal of the splines to final dimensions and give to it a highly finished surface.

In testimony whereof I affix my signature.

IRA B. SWEGLES.